United States Patent
Iwase et al.

(10) Patent No.: US 8,481,155 B2
(45) Date of Patent: Jul. 9, 2013

(54) EPDM FOAM, PRODUCING METHOD THEREOF, AND SEALING MATERIAL

(75) Inventors: Takayuki Iwase, Osaka (JP); Joji Kawata, Osaka (JP); Takumi Kousaka, Osaka (JP); Nobuyuki Takahashi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 90 days.

(21) Appl. No.: 12/926,682

(22) Filed: Dec. 3, 2010

(65) Prior Publication Data

US 2011/0135909 A1 Jun. 9, 2011

(30) Foreign Application Priority Data

Dec. 4, 2009 (JP) ................... 2009-276576

(51) Int. Cl.
*B32B 7/10* (2006.01)
*B29C 44/58* (2006.01)

(52) U.S. Cl.
USPC .......................... 428/343; 428/314.8; 521/142

(58) Field of Classification Search
USPC ............... 428/317.3, 314.8, 343; 521/89, 142
See application file for complete search history.

(56) References Cited

U.S. PATENT DOCUMENTS

| | | | |
|---|---|---|---|
| 5,314,752 A | 5/1994 | Bova et al. | |
| 5,973,017 A | 10/1999 | Okita et al. | |
| 2002/0008357 A1 * | 1/2002 | Kawaguchi et al. | 277/650 |
| 2006/0142405 A1 * | 6/2006 | Kijima | 521/142 |
| 2011/0135904 A1 * | 6/2011 | Iwase et al. | 428/220 |

FOREIGN PATENT DOCUMENTS

| | | |
|---|---|---|
| JP | 11-044055 | 2/1999 |
| JP | 11-222542 | 8/1999 |
| JP | 2001-192488 A | 7/2001 |
| JP | 2001-254071 A | 9/2001 |
| JP | 2002-167459 A | 6/2002 |
| JP | 2003-004138 A | 1/2003 |
| JP | 2006-225415 | 8/2006 |
| JP | 2009-079109 A | 4/2009 |
| KR | 2004-0028276 | 4/2004 |

* cited by examiner

*Primary Examiner* — Hai Vo
(74) *Attorney, Agent, or Firm* — Jean C. Edwards, Esq.; Edwards Neils PLLC

(57) ABSTRACT

An EPDM foam is obtained by foaming a foam composition containing, based on 100 parts by weight of an ethylenepropylenediene rubber, 0.1 to 5 parts by weight of a vulcanizer, 0.1 to 10 parts by weight of a vulcanization accelerator, 1 to 30 parts by weight of a foaming agent, and a foaming auxiliary agent. The vulcanization accelerator contains a thiourea vulcanization accelerator, a thiazole vulcanization accelerator, a dithiocarbamate vulcanization accelerator, and a thiuram vulcanization accelerator such that a thiourea vulcanization accelerator/thiazole vulcanization accelerator/dithiocarbamate vulcanization accelerator/thiuram vulcanization accelerator weight ratio is in a range of 1 to 20/1 to 20/1 to 20/1 to 30.

7 Claims, No Drawings

EPDM FOAM, PRODUCING METHOD THEREOF, AND SEALING MATERIAL

CROSS-REFERENCE TO RELATED APPLICATION

The present application claims priority from Japanese Patent Application No. 2009-276576 filed on Dec. 4, 2009, the content of which is hereby incorporated by reference into this application.

BACKGROUND OF THE INVENTION

1. Field of the Invention

The present invention relates to an EPDM foam, a sealing material including the EPDM foam, and a producing method of the EPDM foam. More particularly, the present invention relates to an EPDM foam which is used suitably as a sealing material for various industrial products, a sealing material including the EPDM foam, and a producing method of the EPDM foam.

2. Description of the Related Art

Conventionally, as a sealing material for various industrial products, an ethylenepropylenediene (hereinafter referred to as EPDM) foam has been known in terms of durability, which is obtained by foaming an EPDM rubber with a foaming agent.

In such an EPDM foam, in addition to a foaming agent, a vulcanizer for vulcanizing EPDM and a vulcanization accelerator for accelerating the vulcanization of EPDM are blended. As vulcanization accelerators, secondary amines are used frequently. However, when secondary amines are used, nitrosamines (N-nitrosodimethylamine, N-nitrosodiethylamine, and the like) may be generated.

Accordingly, as an EPDM foam capable of reducing the generation of nitrosamines therefrom, there has been proposed a foam rubber using, for example, a vulcanization accelerator (N,N'-ethylenethiourea, 2-mercaptobenzothiazole, diphenylguanidine, tetrakis(2-ethylhexyl)thiuram disulfide, or zinc dialkylthiophosphate) free from the possibility of generation of nitrosamines (see, for example, Japanese Unexamined Patent Publication No. 2006-225415).

SUMMARY OF THE INVENTION

In the foregoing foam rubber described in Japanese Unexamined Patent Publication No. 2006-225415, a vulcanization accelerator free from the possibility of generation of nitrosamines is used therein to achieve a compressive permanent strain equivalent to that achieved with a conventional foam rubber using a vulcanization accelerator which may cause generation of nitrosamines. However, the foregoing foam rubber described in the publication has the problem of poor flexibility.

In addition, when the foam rubber having poor flexibility is used as a sealing material, the adhesion of the foam rubber to a target object to be sealed is poor, resulting in the problem that the sealing property of the foam rubber is poor.

It is an object of the present invention to provide an EPDM foam capable of reducing the generation of N-nitrosodimethylamine and N-nitrosodiethylamine therefrom, and having improved flexibility, a sealing material including the EPDM form, and a producing method of the EPDM foam.

An EPDM foam of the present invention is obtained by foaming a foam composition containing, based on 100 parts by weight of an ethylenepropylenediene rubber, 0.1 to 5 parts by weight of a vulcanizer, 0.1 to 10 parts by weight of a vulcanization accelerator, 1 to 30 parts by weight of a foaming agent, and a foaming auxiliary agent, wherein the vulcanization accelerator contains a thiourea vulcanization accelerator, a thiazole vulcanization accelerator, a dithiocarbamate vulcanization accelerator, and a thiuram vulcanization accelerator such that a thiourea vulcanization accelerator/thiazole vulcanization accelerator/dithiocarbamate vulcanization accelerator/thiuram vulcanization accelerator weight ratio is in a range of 1 to 20/1 to 20/1 to 20/1 to 30.

In the EPDM foam of the present invention, it is preferable that the foaming agent is azodicarbonamide.

In the EPDM foam of the present invention, it is preferable that a 50% compression load value thereof is in a range of 0.10 to 2.0 N/cm$^2$.

In the EPDM foam of the present invention, it is preferable that an apparent density thereof is in a range of 0.04 to 0.5 g/cm$^3$.

It is preferable that the EPDM foam of the present invention has an open cell structure or a semi-open/semi-closed cell structure.

A sealing material of the present invention which is a sealing material for filling a gap between members which includes the EPDM foam described above, and an adhesive layer provided on a surface of the EPDM foam.

A producing method of an EPDM foam of the present invention includes a preparation step of preparing a foam composition containing, based on 100 parts by weight of an ethylenepropylenediene rubber, 0.1 to 5 parts by weight of a vulcanizer, 0.1 to 10 parts by weight of a vulcanization accelerator containing a thiourea vulcanization accelerator, a thiazole vulcanization accelerator, a dithiocarbamate vulcanization accelerator, and a thiuram vulcanization accelerator such that a thiourea vulcanization accelerator/thiazole vulcanization accelerator/dithiocarbamate vulcanization accelerator/thiuram vulcanization accelerator weight ratio is in a range of 1 to 20/1 to 20/1 to 20/1 to 30, 1 to 30 parts by weight of a foaming agent, and a foaming auxiliary agent, and a foaming step of heating the foam composition to vulcanize and foam the foam composition.

It is preferable that the producing method of the EPDM foam of the present invention further includes a molding step of extruding the foam composition, and the foaming step includes vulcanizing and foaming the foam composition extruded by the molding step.

In the EPDM foam of the present invention, the vulcanization accelerator contains the thiourea vulcanization accelerator, the thiazole vulcanization accelerator, the dithiocarbamate vulcanization accelerator, and the thiuram vulcanization accelerator at a specific weight ratio.

This can reduce the generation of N-nitrosodimethylamine and N-nitrosodiethylamine, and improve flexibility.

Since the sealing material of the present invention includes the EPDM having the effects described above, it is possible to reliably stick the EPDM foam to a member, and reliably fill a gap between members.

In addition, according to the producing method of the EPDM foam of the present invention, it is possible to easily produce the EPDM foam having the effects described above with high production efficiency.

DETAILED DESCRIPTION OF THE INVENTION

An EPDM foam of the present invention is obtained by foaming a foam composition containing an ethylenepropylenediene (hereinafter referred to as EPDM) rubber, a vulcanizer, a vulcanization accelerator, a foaming agent, and a foaming auxiliary agent.

EPDM is a rubber obtained by copolymerization of ethylene, propylene, and dienes. By further copolymerizing an ethylene-propylene copolymer with dienes to introduce an unsaturated bond, vulcanization with a vulcanizer can be accomplished.

Dienes are not particularly limited. Examples of dienes include, for example, 5-ethylidene-2-norbornene, 1,4-hexadiene, and dicyclopentadiene.

The diene content of EPDM is in a range of, e.g., 1 to 20 wt %, or preferably 3 to 10 wt %.

Examples of the vulcanizer include, for example, sulfur, selenium, magnesium oxides, lead monoxide, organic peroxides (e.g., cumene peroxide), polyamines, oximes (such as, e.g., p-quinone dioxime or p,p'-dibenzoylquinone dioxime), nitroso compounds (such as, e.g., p-dinitrosobenzine), resins (such as, e.g., alkylphenol-formaldehyde resins or melamine-formaldehyde condensates), and ammonium salts (such as, e.g., ammoniumbenzoate). In terms of durability resulting from the vulcanization property of the obtained EPDM foam, sulfur is preferably used. These vulcanizers may be used alone or in combination of two or more kinds.

The blending proportion of the vulcanizer can be determined selectively and appropriately since vulcanization efficiency differs depending on the type thereof. When the vulcanizer is sulfur, the blending proportion thereof based on 100 parts by weight of EPDM is in a range of, e.g., 0.1 to 5 parts by weight, or preferably 0.5 to 3 parts by weight.

The vulcanization accelerator contains a thiourea vulcanization accelerator, a thiazole vulcanization accelerator, a dithiocarbamate vulcanization accelerator, and a thiuram vulcanization accelerator. Preferably, the vulcanization accelerator consists of these four kinds of vulcanization accelerators.

The thiourea vulcanization accelerator is selected from the group consisting of N,N'-diethylthiourea, N,N'-dibutylthiourea, N,N'-diphenylthiourea, and trimethylthiourea.

The thiazole vulcanization accelerator is selected from the group consisting of 2-mercaptobenzothiazole, a zinc salt of 2-mercaptobenzothiazole, a cyclohexylamine salt of 2-mercaptobenzothiazole, and dibenzothiazyl disulfide.

The dithiocarbamate vulcanization accelerator is selected from the group consisting of zinc diisononyldithiocarbamate and zinc dibenzyldithiocarbamate.

The thiuram vulcanization accelerator is selected from the group consisting of tetrakis(2-ethylhexyl)thiuram disulfide and tetrabenzylthiuram disulfide.

The vulcanization accelerator contains the thiourea vulcanization accelerator, the thiazole vulcanization accelerator, the dithiocarbamate vulcanization accelerator, and the thiuram vulcanization accelerator such that a thiourea vulcanization accelerator/thiazole vulcanization accelerator/dithiocarbamate vulcanization accelerator/thiuram vulcanization accelerator weight ratio is in a range of, e.g., 1 to 20/1 to 20/1 to 20/1 to 30, preferably 1 to 15/1 to 10/1 to 10/1 to 30, or more preferably 2 to 15/2 to 7/1 to 5/1 to 25.

The blending proportion of the vulcanization accelerator based on 100 parts by weight of EPDM is in a range of, e.g., 0.1 to 10 parts by weight, or preferably 1.0 to 7.0 parts by weight.

Examples of the foaming agent include, for example, organic foaming agent and inorganic foaming agent. Examples of the organic foaming agent include, for example, azo compounds such as azodicarbonamide (ADCA), barium azodicarboxylate, azobisisobutyronitrile (AIBN), azocyclohexylnitrile, and azodiaminobenzene, hydrazide compounds such as 4,4'-oxybis(benzenesulfonylhydrazide) (OBSH), paratoluenesulfonylhydrazide, diphenylsulfone-3,3'-disulfonylhydrazide, 2,4-toluenedisulfonylhydrazide, p,p-bis(benzenesulfonylhydrazide)ether, benzene-1,3-disulfonylhydrazide, and allylbis(sulfonylhydrazide), semicarbazide compounds such as p-toluoylenesulfonyl semicarbazide and 4,4'-oxybis(benzenesulfonyl semicarbazide), alkane fluorides such as trichloromonofluoromethane and dichloromonofluoromethane, and triazole compounds such as 5-morpholyl-1,2,3,4-thiatriazole. Examples of the inorganic foaming agent include, for example, hydrogen carbonates such as sodium hydrogen carbonate and ammonium hydrogen carbonate, carbonates such as sodium carbonate and ammonium carbonate, nitrites such as sodium nitrite and ammonium nitrite, borohydrides such as sodium borohydride, and azides. Preferably, organic foaming agents are used. More preferably, azo compounds are used or, most preferably, azodicarbonamide (ADCA) is used.

Note that, as the organic foaming agents, thermally expandable fine particles obtained by encapsulating a heat-expandable material in microcapsules or the like may also be used. As such thermally expandable fine particles, a commercially available product such as Microsphere™ (available from Matsumoto Yushi Seiyaku Co., Ltd.) may also be used. These foaming agents may be used alone or in combination of two or more kinds.

The blending proportion of the foaming agent based on 100 parts by weight of EPDM is in a range of, e.g., 1 to 30 parts by weight, or preferably 5 to 25 parts by weight.

Examples of the foaming auxiliary agent include, for example, urea compounds, salicylic acid compounds, and benzoic acid compounds. Preferably, urea compounds are used. These foaming auxiliary agents may be used alone or in combination of two or more kinds.

The blending proportion of the foaming auxiliary agent based on 100 parts by weight of EPDM is in a range of, e.g., 1 to 15 parts by weight, or preferably 2 to 10 parts by weight.

As necessary, the foam composition can appropriately contain a vulcanization auxiliary agent, a lubricant, a filler, a pigment, a softener, and the like.

Examples of the vulcanization auxiliary agent include, for example, zinc oxide. The blending proportion of the vulcanization auxiliary agent based on 100 parts by weight of EPDM is in a range of, e.g., 1 to 20 parts by weight, or preferably 2 to 10 parts by weight.

Examples of the lubricant include, for example, a stearic acid and esters thereof. The blending proportion of the lubricant based on 100 parts by weight of EPDM is in a range of, e.g., 0.5 to 5 parts by weight, or preferably 1 to 3 parts by weight.

Examples of the filler include, for example, inorganic fillers such as calcium carbonate (such as, e.g., heavy calcium carbonate), magnesium carbonate, calcium hydroxide, magnesium hydroxide, aluminum hydroxide, silicic acid and salts thereof, clay, talc, mica powder, bentonite, silica, alumina, aluminum silicate, acetylene black, and aluminum powder, organic fillers such as cork, and other known fillers. Preferably, inorganic fillers are used or, more preferably, calcium carbonate is used. These fillers may be used alone or in combination of two or more kinds.

The blending proportion of the filler based on 100 parts by weight of EPDM is in a range of not more than 300 parts by weight, or preferably not more than 200 parts by weight.

Examples of the pigment include, for example, carbon black. The blending proportion of the pigment based on 100 parts by weight of EPDM is in a range of, e.g., 0.1 to 80 parts by weight, or preferably 0.5 to 50 parts by weight.

Examples of the softener include, for example, drying oils, animal/vegetable oils (e.g., flaxseed oil), paraffins, asphalts, petroleum-derived oils (such as, e.g., paraffin process oils, naphtene process oils, and aromatic oils), low-molecular polymers, organic acid esters (e.g., ester phthalates (e.g., di-2-ethylhexyl phthalate (DOP) or dibutyl phthalate (DBP))), phosphoric acid esters, higher fatty acid esters, and alkylsulfonic acid esters), and tackifiers. Preferably, paraffins, asphalts, and petroleum-derived oils are used. These softeners may be used alone or in combination of two or more kinds.

The blending proportion of the softener based on 100 parts by weight of EPDM is in a range of, e.g., 20 to 300 parts by weight, or preferably 50 to 200 parts by weight.

As necessary, the foam composition can further appropriately contain known additives such as, e.g., plasticizer, anti-aging agent, antioxidant, coloring agent, fungicide, or flame retardant in a range which does not affect the excellent effects of the obtained EPDM foam.

Next, a description is given to a producing method of the EPDM foam.

To produce the EPDM foam, the individual components shown above are first blended and kneaded using a kneader, a mixer, a mixing roll, or the like to prepare a foam composition as a mixture (preparation step).

Note that, in the preparation step, it is also possible to perform kneading, while appropriately performing heating. In the preparation step, it is also possible to, e.g., first knead the components other than the vulcanizer, the vulcanization accelerator, the foaming agent, and the foaming auxiliary agent to prepare a primary mixture, and then add the vulcanizer, the vulcanization accelerator, the foaming agent, and the foaming auxiliary agent to the primary mixture to prepare the foam composition (secondary mixture). Alternatively, it is also possible that, when the primary mixture is prepared, a part (e.g., thiourea vulcanization accelerator) of the vulcanization accelerator is blended therein.

A scorch time $t_5$ (according to JIS K 6300-1) of the prepared foam composition at 120° C. is in a range of, e.g., not less than 20 minutes, or preferably not less than 30 minutes.

Then, using an extruder, the prepared foam composition is extruded into a sheet-like shape or the like (molding step), and the extruded foam composition is heated to be vulcanized and foamed (foaming step).

Heating conditions for the foam composition are selected appropriately according to the vulcanization initiation temperature of the blended vulcanizer, the foaming temperature of the blended foaming agent, and the like. For example, using a circulating hot air oven or the like, the foam composition is pre-heated at a temperature in a range of, e.g., 40 to 200° C., or preferably 60 to 160° C. for, e.g., 1 to 60 minutes, or preferably 5 to 40 minutes, and then heated at a temperature in a range of, e.g., not more than 450° C., preferably 100 to 350° C., or more preferably 120 to 250° C. for, e.g., 5 to 80 minutes, or preferably 15 to 50 minutes.

Alternatively, using an extruder, the prepared foam composition can also be continuously extruded (molding step) into a sheet-like shape, while being heated, to be continuously vulcanized and foamed (foaming step).

In this manner, the foam composition is vulcanized, while being foamed, and the EPDM foam can be obtained.

The producing method of the EPDM foam of the present invention allows the EPDM foam having the effects described above to be easily produced with high production efficiency.

The thickness of the obtained EPDM foam is in a range of, e.g., 0.1 to 50 mm, or preferably 1 to 45 mm.

Note that, using rolls or needles, closed cells in the obtained EPDM foam can be physically broken into an open cell.

In this manner, it is possible to form the EPDM foam into an open cell structure (having a 100% open cell ratio) or a semi-open/semi-closed cell structure (having an open cell ratio of more than 0% and less than 100%, or preferably 10 to 98%).

If the EPDM foam has the open cell structure, the EPDM foam has the advantage of excellent flexibility. If the EPDM foam has the semi-open/semi-closed cell structure, the EPDM foam has the advantage of an excellent sealing property such as waterstop and airtightness.

The average cell diameter of the EPDM foam is in a range of, e.g., 300 to 1200 μm, or preferably 300 to 1000 μm.

The volume expansion ratio (ratio between a pre-foaming apparent density and a post-foaming apparent density) of the EPDM foam thus obtained is in a range of, e.g., not less than 2, or preferably not less than 5, and normally not more than 30. The apparent density (according to JIS K 6767) of the EPDM foam is in a range of, e.g., not more than 0.5 g/cm$^3$, preferably 0.04 to 0.5 g/cm$^3$, or more preferably 0.04 to 0.3 g/cm$^3$.

The 50% compression load value (according to JIS K 6767) of the EPDM foam is in a range of, e.g., 0.10 to 2.0 N/cm$^2$, or preferably 0.1 to 0.5 N/cm$^2$.

The tensile strength (maximum load in a tensile test according to JIS K 6767) of the EPDM foam is in a range of, e.g., 1.0 to 50.0 N/cm$^2$, or preferably 2.0 to 30.0 N/cm$^2$.

The elongation percentage (according to JIS K 6767) of the EPDM foam is in a range of, e.g., 10 to 1500%, or preferably 200 to 1000%.

The air permeability (at 20° C. according to JIS K 1096) of the EPDM foam during 30% compression is in a range of, e.g., not more than 2.0 cm$^3$/cm$^2$s, or preferably 0.001 to 1.0 cm$^3$/cm$^2$s. The air permeability (at 20° C. according to JIS K 1096) of the EPDM foam during 50% compression is in a range of, e.g., not more than 1.0 cm$^3$/cm$^2$s, or preferably 0.001 to 0.5 cm$^3$/cm$^2$s.

The compressive permanent strain (at 23° C. according to JIS K 6767) of the EPDM foam after 30 minutes is in a range of, e.g., 0 to 40%, or preferably 0 to 30%. The compressive permanent strain (at 23° C. according to JIS K 6767) of the EPDM foam after 24 hours is in a range of, e.g., 0 to 30%, or preferably 0 to 20%.

An amount (measured by a gas chromatographic/mass spectrometric (GC/MS) method, e.g., a measurement method described later) of nitrosamines (including N-nitrosodimethylamine and N-nitrosodiethylamine) generated when the EPDM foam is heated at 200° C. for three hours is in a range of, e.g., not more than 1.0 μg/g, preferably not more than 0.8 μg/g, or more preferably not more than a limit of detection.

In nitrosamines measured by the GC/MS method, an amount of generated N-nitrosodimethylamine is in a range of, e.g., not more than 0.4 μg/g, or preferably not more than a limit of detection and an amount of generated N-nitrosodiethylamine is in a range of, e.g., not more than 0.4 μg/g, or preferably not more than a limit of detection.

Note that, in consideration of variations in the amount of generated nitrosamines due to vaporization thereof, the measurement of nitrosamines by the GC/MS method is preferably performed after the lapse of two days or more since the foaming of the EPDM foam.

Applications of the EPDM foam are not particularly limited. The EPDM foam can be used as, e.g., as vibration proof materials, sound absorbers, sound insulators, dust control materials, heat insulators, buffers, waterstop materials, and the like which fill a gap between various members for the purposes of vibration damping, sound absorption, sound insulation, dust control, heat insulation, buffering, water-tightness, and the like.

To use the EPDM foam for the applications shown above, a sealing material in which an adhesive layer for attaching the EPDM foam is provided on a surface of the EPDM foam is prepared.

In particular, if the EPDM foam has an average cell diameter of not more than 1200 μm, an air permeability of not more than 1.0 cm$^3$/cm$^2$s during 50% compression, a tensile strength of not less than 5 N/cm$^2$, an elongation percentage of not less than 150%, and a compressive permanent strain (at 23° C.) of not more than 10% after 24 hours, the EPDM foam can be used appropriately as a sealing material in terms of dust controllability, curved-surface conformability, and uneven-surface conformability.

Specifically, the EPDM foam having the foregoing physical properties has high flexibility (tensile strength and elongation percentage) and high restorability (low compressive permanent strain), and therefore it is possible to improve the adhesiveness thereof to a target object, and reduce an air permeable property (air permeability) in the inside of the foam. As a result, such an EPDM foam can improve a sealing property at the interface between the foam and the target object and in the inside of the foam, and can be used appropriately as a sealing material.

By the adhesive force of the adhesive layer, the sealing material is attached into a gap between various members so that the EPDM foam evenly fills the gap between various members.

In such an EPDM foam of the present invention, the vulcanization accelerator contains the thiourea vulcanization accelerator, the thiazole vulcanization accelerator, the dithiocarbamate vulcanization accelerator, and the thiuram vulcanization accelerator at a specific weight ratio.

This can reduce the generation of nitrosamines, and improve flexibility.

Since the sealing material of the present invention includes the EPDM having the effects described above, it is possible to reliably stick the EPDM foam to a member, and reliably fill a gap between members.

EXAMPLES

While in the following, the present invention will be described in further detail with reference to Examples and Comparative Examples, the present invention is not limited to any of them.
(1) Production of EPDM Foam
(1-1) Formulation Components
<A> Resins
EPDM (A): EPT3045 (available from Mitsui Chemical Co., Ltd, and having a diene content of 4.7 wt %)
EPDM (B): EP-24 (available from JSR Corporation, and having a diene content of 4.5 wt %)
EPDM (C): Esprene 501A (available from Sumitomo Chemical Co., Ltd, and having a diene content of 4.0 wt %)
Atactic PP (atactic polypropylene resin available from Chiba Fine Chemical Co., Ltd.)<
<B> Vulcanization Auxiliary Agent:
Zinc Oxide: Second class of zinc oxides (available from Mitsui Mining & Smelting Co., Ltd.)
<C> Lubricant:
Stearic Acid: Sakura (stearic acid powder available from NOF Corporation)

<D> Filler:
Calcium Carbonate: N heavy calcium carbonate (available from Maruo Calcium Co., Ltd.)
<E> Pigment:
Carbon Black: Asahi #50 (available from Asahi Carbon Co., Ltd.)
<F> Softeners:
Paraffin: Prapellet 130 (available from Taniguchi Petroleum Co., Ltd, and having a melting point of 54.4 to 57.2° C. and a rate of penetration of not more than 50)
Asphalt: Blown Asphalt 10-20 (available from Nippon Oil Corporation, and having a softening point of 135 to 142° C. and a rate of penetration (at 25° C.) of 10 to 20)
Paraffin Oil: Paraffin process oil (Diana Process Oil PW-90 available from Idemitsu Kosan Co., Ltd., and having a density of 0.85 to 0.89 g/cm$^3$ and a kinetic viscosity (at 40° C.) of 75.0 to 105.0 cSt)
<G> Vulcanizer:
Sulfur: Alphagran S-50EN (available from Touchi Co., Ltd.)
<H> Vulcanization Accelerators:
Thiourea Vulcanization Accelerator: N,N'-dibutylthiourea (Nocceler BUR available from Ouchi-Shinko Chemical Industrial Co., Ltd.)
Thiazole Vulcanization Accelerator: 2-mercaptobenzothiazole (Nocceler M available from Ouchi-Shinko Chemical Industrial Co., Ltd.)
Dithiocarbamate Vulcanization Accelerator: Zinc dibenzyldithiocarbamate (Nocceler ZTC available from Ouchi-Shinko Chemical Industrial Co., Ltd.)
Thiuram Vulcanization Accelerator: Tetrabenzylthiuram disulfide (Nocceler TBzTD available from Ouchi-Shinko Chemical Industrial Co., Ltd.)
<I> Foaming Agents:
ADCA (azodicarbonamide): AC#LQ (available from Eiwa Chemical Industrial Co., Ltd.)
Sodium Hydrogen Carbonate: FE-507 (available from Eiwa Chemical Industrial Co., Ltd.)
DPT (N,N'-dinitrosopentamethylenetetramine): Cellular CK#54 (available from Eiwa Chemical Industrial Co., Ltd.)
<J> Foaming Auxiliary Agent:
Urea Foaming Auxiliary Agent: Cellpaste K5 (available from Eiwa Chemical Industrial Co., Ltd.)
(1-2) Production Steps
At the blending ratios shown in the blending formulation shown in Table 1, the resins, the vulcanization auxiliary agent, the lubricant, the filler, the pigment, the softeners, and the thiourea vulcanization accelerator were blended, and kneaded with a 3 L pressure kneader to prepare primary mixtures.

In the meantime, the vulcanizer, the vulcanization accelerators (except for the thiourea vulcanization accelerator), the foaming agents, and the foaming auxiliary agent were blended. Thereafter, the obtained mixtures were blended with the primary mixtures, and kneaded with a 10-inch mixing roll to prepare foam compositions (secondary mixtures) (preparation step).

Then, the scorch time $t_5$ of each of the composition foams was measured according to JIS K 6300-1. The result of the measurement is shown in Table 1.

Then, using a uniaxial extruder (45 mm), the foam compositions were each extruded into a sheet-like shape having a thickness of about 8 mm to prepare foam composition sheets (molding step).

Then, the foam composition sheets were pre-heated in a circulating hot air oven at 120° C. for 20 minutes. Thereafter, a temperature in the circulating hot air oven was raised to 160°

C. over a period of 10 minutes, and the foam composition sheets were heated at 160° C. for 20 minutes to be vulcanized and foamed (foaming step) so that EPDM foams were obtained.

(2) Measurement of Physical Properties

The respective physical properties of the obtained EPDM foams were measured by the methods shown below. The result of the measurement is shown in Table 1.

<A> Apparent Density

Measurement was performed according to JIS K 6767. Specifically, skin layers in the EPDM foams of individual Examples and Comparative Examples were removed, and specimens each having a thickness of about 10 mm were prepared. Thereafter, the weight of each of the specimens was measured, and a weight (apparent density) per unit volume was calculated.

<B> 50% Compression Load Value

Measurement was performed according to JIS K 6767. Specifically, skin layers in the EPDM foams of individual Examples and Comparative Examples were removed, and specimens each having a thickness of about 10 mm were prepared. Thereafter, using a compression tester, each of the specimens was subjected to 50% compression at a compression speed of 10 mm/minute, and the compression load value thereof after 10 seconds was measured.

<C> Tensile Strength and Elongation Percentage

Measurement was performed according to JIS K 6767. Specifically, skin layers in the EPDM foams of individual Examples and Comparative Examples were removed, and specimens each having a thickness of about 10 mm were prepared. Thereafter, using a dumbbell #1, the specimens were each punched out to provide measurement samples. Using a tensile tester, each of the measurement samples was pulled at a tensile speed of 500 mm/minute, and the load (tensile strength) and elongation percentage of the measurement sample when it was cut at the parallel portion of a dumbbell shape were measured.

<D> Average Cell Diameter

Using a digital microscope (VH-8000 available from Keyence Corporation), an enlarged image of the cell portion of each of the foams was collected, and subjected to image analysis using an image analysis software (Win ROOF available from Mitani Corporation), so that the average cell diameter ($\mu$/m) was determined.

<E> Air Permeability

According to JIS K 1096 (fragile test method), air permeabilities during 30% compression and during 50% compression were measured. Specifically, skin layers in the EPDM foams of individual Examples and Comparative Examples were removed, and specimens each having a thickness of about 10 mm were prepared. Thereafter, the specimens were each punched out into a ring shape having an outer diameter of 108 mm and an inner diameter of 80 mm to provide measurement samples. Using an air permeability measuring apparatus (3C-200 available from Daiei Kagaku Seiki Mfg. Co., Ltd.), each of the measurement samples was subjected to 30% compression and 50% compression, and the air permeabilities thereof were measured.

<F> 50% Compressive Permanent Strain

According to JIS K 6767, 50% compressive permanent strains after 30 minutes and after 24 hours were measured.

<G> Amount of Generated N-Nitrosodimethylamine and N-Nitrosodiethylamine

Using a GC/MS, measurement was performed. First, two days after foaming, about 0.25 g of each of the EPDM foams (or 1 μl of a chloroform solution of N-nitrosodimethylamine or N-nitrosodiethylamine at a specific concentration as a standard sample) was placed in a 20 ml vial container, tightly sealed, and heated at 200° C. for three hours using a headspace sampler (HSS).

Then, 1 ml of a gas in the vial container after heating was injected into the GC/MS. HSS conditions and GC/MS measurement conditions are shown below.

(1) Headspace Sampler (HSS) Conditions

Apparatus: 7694 (available from Agilent Technologies)

Oven Temperature: 200° C.

Heating Time: 3 hours

Pressurization Time: 0.12 minutes

Loop Fill Time: 0.12 minutes

Loop Equilibration Time: 0.05 minutes

Injection Time: 3.00 minutes

Sample Loop Temperature: 220° C.

Transfer Line Temperature: 220° C.

(2) Gas Chromatography (GC) Conditions

Apparatus: 6890 (available from Agilent Technologies)

Column: Ultra 2 (100% dimethylpolysiloxane, 50 m×0.32 mm (Inner Diameter)×0.52 μm (Film Thickness), available from Agilent Technologies)

Column Temperature: Maintained at 40° C. for 3 minutes, subsequently raised to 300° C. at a rate of 10° C./minute, and then maintained at 300° C. for 11 minutes Column Pressure: 17.2 kPa (constant flow mode)

Carrier Gas: Herium

Carrier Gas Flow Rate: 1.0 ml/minute (constant flow mode)

Inlet Temperature: 250° C.

Injection Method Split (split ratio of 20:1)

Detector: MS (3) Mass Spectrometry (MS) Conditions

Apparatus: 5973 (available from Agilent Technologies)

Ionization Method Electron ionization method

Emission Current: 35 μA

Electron Energy: 70 eV

E. M. Voltage: 1259 V

Source Temperature: 230° C.

Analyzer: Quadrupole type

Q-Pole Temperature: 150° C.

Interface Temperature: 300° C.

Mass Range: m/z 10 to 800

Then, by comparing a peak area at m/z=74 or m/z=102 in the obtained measurement data with the separately measured peak area of N-nitrosodimethylamine (m/z=74) or N-nitrosodiethylamine (m/z=102) as the standard sample, an amount of N-nitrosodimethylamine or an amount of N-nitrosodiethylamine generated from each of the EPDM foams was quantitatively determined.

The total amount of the amount of generated N-nitrosodimethylamine and the amount of generated N-nitrosodiethylamine that were quantitatively determined was assumed to be an amount of generated nitrosamines. A limit of detection was 0.4 μg/g.

TABLE 1

| | | | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|---|---|
| Blending Formulation (Part By Weight) | Resins | EPDM(A) | 50 | 50 | 50 | 50 | 50 | 50 | 50 | 50 | | 50 | 50 |
| | | EPDM(B) | 50 | 50 | 50 | 50 | 50 | 50 | 50 | 50 | | 50 | 50 |
| | | EPDM(C) | | | | | | | | | 100 | | |
| | | Atactic PP | | | | | | | | | 200 | | |
| | Vulcanization Auxiliary Agent | Zinc Oxide | 5 | 5 | 5 | 5 | 5 | 5 | 5 | 5 | 5 | 5 | 5 |
| | Lubricant | Stearic Acid | 3 | 3 | 3 | 3 | 3 | 3 | 3 | 3 | 3 | 3 | 3 |
| | Filler | Calcium Carbonate | 100 | 100 | 100 | 100 | 100 | 100 | 100 | 100 | 50 | 100 | 100 |
| | Pigment | Carbon Black | 10 | 10 | 10 | 10 | 10 | 10 | 10 | 10 | | 10 | 10 |
| | Softeners | Paraffin | 5 | 5 | 5 | 5 | 5 | 5 | 5 | 5 | | 5 | 5 |
| | | Asphalt | 130 | 130 | 130 | 130 | 130 | 130 | 130 | 130 | | 130 | 130 |
| | | Paraffin Oil | 40 | 40 | 40 | 40 | 40 | 40 | 40 | 40 | 20 | 40 | 40 |
| | Vulcanizer | Sulfur | 1.6 | 1.35 | 1.35 | 1 | 1.35 | 1.35 | 1.35 | 1.35 | 2 | 1.35 | 1.35 |
| | Vulcanization Accelerators | Thiourea Vulcanization Accelerator | 1 | 1 | 1 | 1 | 1 | 1 | 1 | 5 | | | 1 |
| | | Thiazole Vulcanization Accelerator | 0.45 | 0.45 | 0.45 | 0.45 | 0.45 | 0.45 | 0.45 | 2.25 | 2 | 0.45 | |
| | | Dithiocarbamate Vulcanization Accelerator | 0.2 | 0.2 | 1.2 | 0.2 | 0.2 | 0.2 | 0.2 | 0.2 | | 1.13 | 0.2 |
| | | Thiuram Vulcanization Accelerator | 2.26 | 0.57 | 1.13 | 0.2 | 1.8 | 1.8 | 1.13 | 8 | | 1.13 | 1.13 |
| | Foaming Agents | ADCA | 20 | 18.5 | 17.5 | 10 | 20 | 20 | 8 | 20 | | 18.5 | 18.5 |
| | | Sodium Hydrogen Carbonate | | | | | | | | | 20 | | |
| | | DPT | | | | | | | | | 20 | | |
| | Foaming Auxiliary Agent | Urea Foaming Auxiliary Agent | 6.5 | 6.5 | 5.5 | 5.5 | 6.5 | 6.5 | 6.5 | 6.5 | | 4.7 | 6.5 |
| Physical Properties | | Scorch Time (t₅, at 120° C.) | >20 | >20 | >20 | >20 | >20 | >20 | >20 | >20 | — | — | — |
| | | Physical Cell Collapse | Present | Present | Present | Present | Present | Absent | Present | Foaming Failure | Present | Foaming Failure | Foaming Failure |
| | | Apparent Density (g/cm³) | 0.082 | 0.148 | 0.097 | 0.133 | 0.074 | 0.074 | 0.177 | | 0.15 | | |
| | | 50% Compression Load Value (N/cm²) | 0.49 | 1.38 | 1.03 | 0.64 | 0.28 | 0.6 | 5.18 | | 0.8 | | |
| | | Tensile Strength (N/cm²) | 8.2 | 12.6 | 11.5 | 10.1 | 5.9 | 7.3 | 20.6 | | — | | |
| | | Elongation Percentage (%) | 778 | 665 | 513 | 835 | 468 | 540 | 503 | | — | | |
| | | Average Cell Diameter (μm) | 468 | 390 | 520 | 415 | 490 | 484 | — | | — | | |
| | | Air Permeability (During 30% Compression, cm³/cm²s) | 0.03 | 0.003 | 0.012 | 0.003 | 0.016 | 0.011 | — | | — | | |
| | | Air Permeability (During 50% Compression, cm³/cm²s) | 0.014 | 0.002 | 0.003 | 0.001 | 0.006 | 0.003 | — | | — | | |
| | | 50% Compressive Permanent Strain (After 30 Minutes, %) | 5.3 | 7.8 | 26.9 | 3.9 | 5 | 10.8 | — | | — | | |
| | | 50% Compressive Permanent Strain (After 24 Hours, %) | 0.5 | 2.9 | 6.7 | 0.6 | 0.6 | 0.6 | — | | — | | |
| | | N-nitrosodimethylamine (μg/g) | <0.4 | <0.4 | <0.4 | <0.4 | <0.4 | <0.4 | <0.4 | | .1 | | |
| | | N-nitrosodiethylamine (μg/g) | <0.4 | <0.4 | <0.4 | <0.4 | <0.4 | <0.4 | <0.4 | | .1 | | |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

What is claimed is:

1. An EPDM foam obtained by foaming a foam composition containing, based on 100 parts by weight of an ethylenepropylenediene rubber, 0.1 to 5 parts by weight of a vulcanizer, 0.1 to 10 parts by weight of a vulcanization accelerator, 1 to 30 parts by weight of a foaming agent, and a foaming auxiliary agent, wherein the vulcanization accelerator in the form of a four-component composition contains a thiourea vulcanization accelerator, a thiazole vulcanization accelerator, a dithiocarbamate vulcanization accelerator, and a thiuram vulcanization accelerator such that a thiourea vulcanization accelerator/thiazole vulcanization accelerator/dithiocarbamate vulcanization accelerator/thiuram vulcanization accelerator weight ratio is in a range of 1 1 to 20/1 to 20/1 to 20/1 to 30:

wherein the thiourea vulcanization accelerator is at least one selected from the group consisting of N,N'-diethylthiourea, N,N'-dibutylthiourea, N,N'-diphenylthiourea, and trimethylthiourea, and wherein the EPDM foam has a semi-open/semi-closed structure.

2. The EPDM foam according to claim 1, wherein the foaming agent is azodicarbonamide.

3. The EPDM foam according to claim 1, wherein a 50% compression load value thereof is in a range of 0.10 to 2.0 $N/cm^2$.

4. The EPDM foam according to claim 1, wherein an apparent density thereof is in a range of 0.04 to 0.5 $g/cm_3$.

5. A sealing material for filling a gap between members, comprising:

an EPDM foam; and an adhesive layer provided on a surface of the EPDM foam, wherein the EPDM foam is obtained by foaming a foam composition containing, based on 100 parts by weight of an ethylenepropylenediene rubber, 0.1 to 5 parts by weight of a vulcanizer, 0.1 to 10 parts by weight of a vulcanization accelerator, 1 to 30 parts by weight of a foaming agent, and a foaming auxiliary agent, and wherein the vulcanization accelerator in the form of a four-component composition contains a thiourea vulcanization accelerator, a thiazole vulcanization accelerator, a dithiocarbamate vulcanization accelerator, and a thiuram vulcanization accelerator such that a thiourea vulcanization accelerator/thiazole vulcanization accelerator/dithiocarbamate vulcanization accelerator/thiuram vulcanization accelerator weight ratio is in a range of 1 to 20/1 to 20/1 to 20/1 to 30, wherein the thiourea vulcanization accelerator is at least one selected from the group consisting of N,N'-diethylthiourea, N,N'-dibutythiourea, N,N'-diphenylthiourea, and trimethylthiourea, and wherein the EPDM foam has a semi-open/semi-closed structure.

6. A producing method of an EPDM foam, comprising:

a preparation step of preparing a foam composition containing, based on 100 parts by weight of an ethylenepropylenediene rubber, 0.1 to 5 parts by weight of a vulcanizer, 0.1 to 10 parts by weight of a vulcanization accelerator, 1 to 30 parts by weight of a foaming agent, and a foaming auxiliary agent, wherein the vulcanization accelerator is in the form of a four-component composition containing a thiourea vulcanization accelerator, a thiazole vulcanization accelerator, a dithiocarbamate vulcanization accelerator, and a thiuram vulcanization accelerator such that a thiourea vulcanization accelerator/thiazole vulcanization accelerator/dithiocarbamate vulcanization accelerator/thiuram vulcanization accelerator weight ratio is in a range of 1 to 20/1 to 20/1 to 20/1 to 30, wherein the thiourea vulcanization accelerator is at least one selected from the group consisting of N,N'-diethylthiourea, N,N'-dibutythiourea, N,N'-diphenylthiourea, and trimethylthiourea, and wherein the EPDM foam has a semi-open/semi-closed structure; and a foaming step of heating the foam composition to vulcanize and foam the foam composition.

7. The producing method of the EPDM foam according to claim 6, further comprising:

a molding step of extruding the foam composition, wherein the molding step includes vulcanizing and foaming the foam composition extruded by the forming step.

* * * * *